United States Patent Office 3,396,328
Patented Aug. 6, 1968

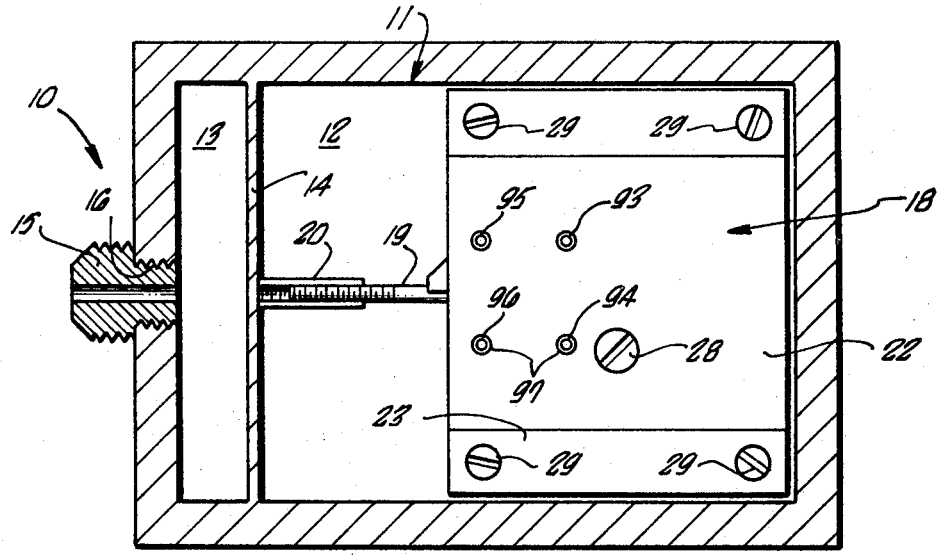
FIG_1.
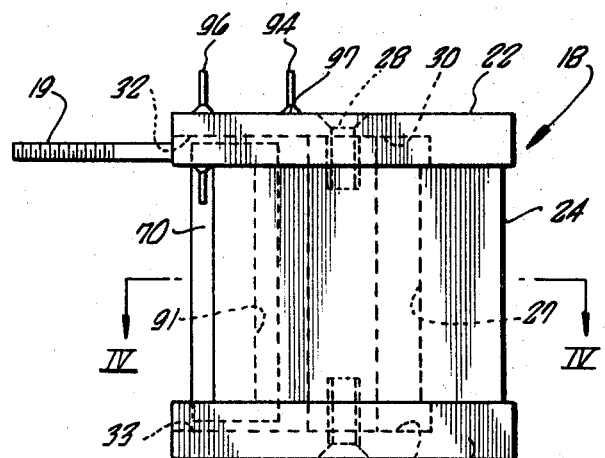
FIG_3.
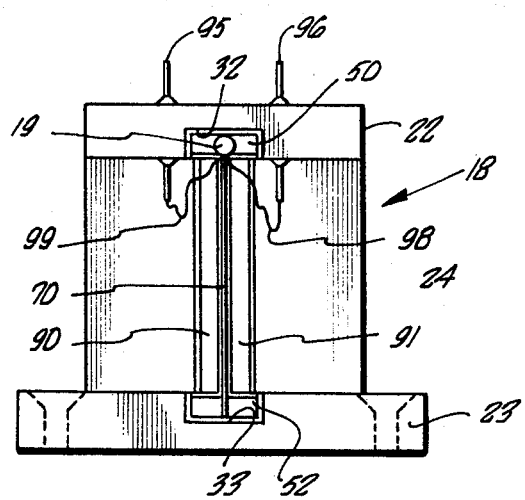
FIG_2.
INVENTOR.
LLOYD TAN-WAI YUAN
BY
Christie, Parker & Hale
ATTORNEYS.

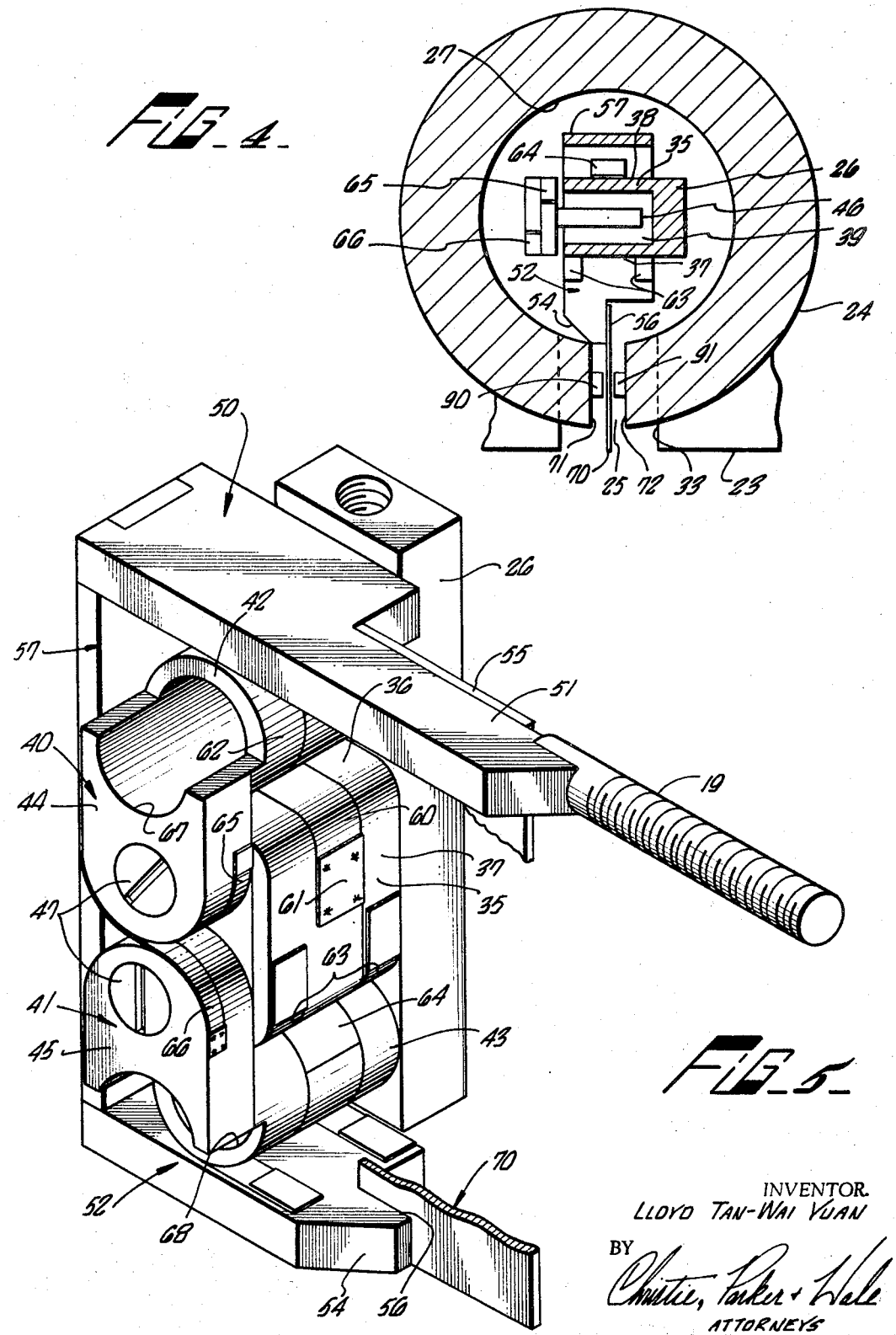

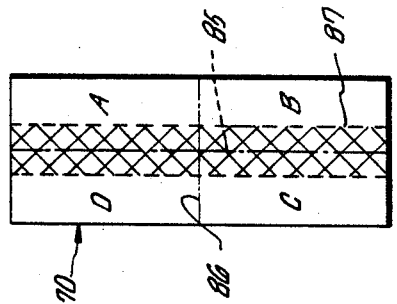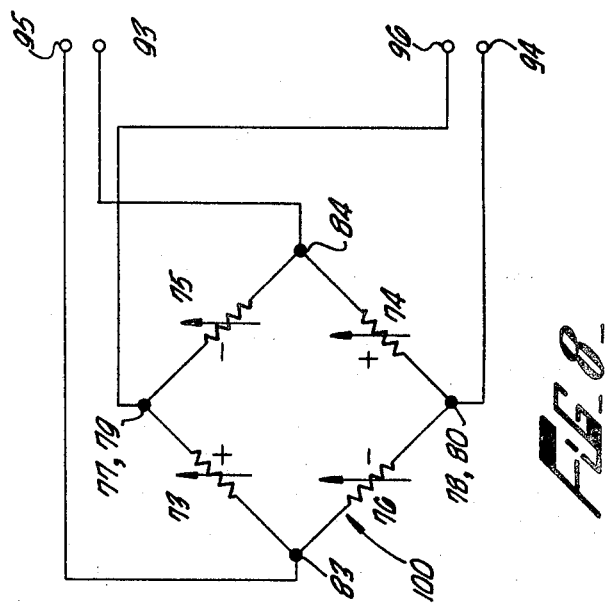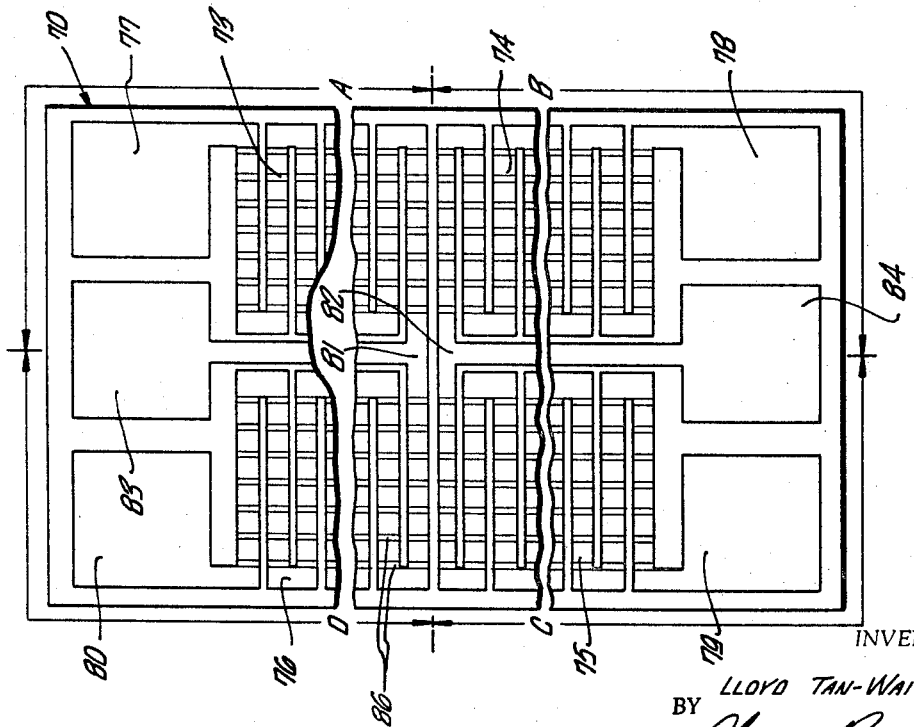

3,396,328
MAGNETORESISTIVE TRANSDUCER
Lloyd Tan-Wai Yuan, Los Angeles, Calif., assignor to Consolidated Electrodynamics Corporation, Pasadena, Calif., a corporation of California
Filed June 25, 1965, Ser. No. 467,061
3 Claims. (Cl. 323—75)

ABSTRACT OF THE DISCLOSURE

An instrument transducer such as a magnetoresistive transducer in which a signal is produced by linear movement of one element relative to a second element in response to movement of a phenomenon sensing member to which one of the elements is connected and in which linearity of relative movement between the elements is provided by a strapped roller mechanism assuring that movement of the two elements is only along the desired line and featuring low friction, low inertia properties.

---

This invention relates to instrument transducers and, more particularly, to an instrument transducer in which movement of a magnetoresistive element in a magnetic field is used to produce a signal which varies in value in response to variations in the value of a physical phenomenon to which the transducer is sensitive. The invention also provides a low inertia linear movement for an instrument transducer.

Magnetoresistance is a phenomenon wherein a change in an electrical resistance results in a solid from the application of a magnetic field to the solid. If an electric potential is impressed longitudinally across a rectangular slab of a conductive material, a current is produced in the slab as the negatively charged electrons of the atoms in the slab migrate toward the positively charged end of the slab. Normally the electrons tend to move in straight lines along the slab. If a magnetic field is applied to the slab in the direction of its thickness, the electrons are deflected in the direction of the width of the slab from their normally straight paths. Since the effective path length which electrons must follow in moving from one end of the slab to the other is increased by the presence of the magnetic field, the resistance to current flow is increased. The stronger the magnetic field, the greater the electron deflection, and the greater the increase in resistance. Since this increase in resistance is produced by a magnetic field, the effect is known as magnetoresistance. The magnetoresistance effect is greatest in semi-metallic conductors.

This invention provides a magnetoresistive instrument transducer for sensing the value of a physical phenomenon such as displacement, velocity, pressure, or the like. The transducer has a highly linear output characteristic and is compact. The transducer has a low inertia, highly linear movement (the movement being the mechanism for mounting the magnetoresistive element for movement in a magnetic field), and is especially suited for use in sensing accelerations.

Generally speaking, this invention provides a transducer for sensing the value of a selected physical phenomenon. The transducer includes a member mounted for movement in response to variations in the value of the phenomenon from a reference value of the phenomenon. Magnetic means are provided to define a gap in a magnetic field across the gap. A plurality of magnetoresistive resistance elements are also provided. The transducer further includes means for interconnecting the resistance elements in a bridge circuit. Further, the transducer includes means which mount the resistance elements in the gap for movement transversely of the magnetic field in response to movement of the member.

The above mentioned and other features of the present invention are more fully set forth in the following detailed description and explanation of a presently preferred embodiment of a transducer according to this invention, which description is presented in conjunction with the accompanying drawings wherein:

FIG. 1 is a cross-sectional plan view of a pressure transducer according to this invention showing the top of a transducer movement housing within the transducer;

FIG. 2 is a front elevation view of the transducer movement housing shown in FIG. 1;

FIG. 3 is a side elevation view of the movement housing illustrated in FIG. 2;

FIG. 4 is a cross-sectional plan view taken along line IV—IV of FIG. 3;

FIG. 5 is a perspective view of a portion of the transducer movement disposed in the movement housing illustrated in FIGS. 2 and 3;

FIG. 6 is an enlarged fragmentary elevation view of the magnetoresistive elements of a transducer according to this invention;

FIG. 7 is a schematic representation of the normal relationship between a magnetic field and the magnetoresistive elements provided in a transducer according to this invention; and FIG. 8 is an electrical schematic diagram of the relationship between the magnetoresistive elements in a transducer according to this invention.

FIG. 1 shows a pressure transducer 10 according to this invention including a housing 11 defining therein a major internal chamber 12 separated from a smaller chamber 13 by a force summing diaphragm 14. An axially bored tubing fitting 15 is threadably engaged in an opening 16 through the housing from the exterior of the housing into communication with chamber 13. The fitting adapts the transducer housing for connection to a suitable tubing or conduit leading to a source of fluid the pressure of which is to be determined.

A transducer movement 18 is mounted in chamber 12 in spaced relation to the force summing diaphragm. An activating arm 19 for the transducer movement disposed in housing 18 (which movement is described in detail below) is threadably engaged within a sleeve 20 secured to the force summing diaphragm, as by silver soldering. Diaphragm 14 deflects in proportion to changes in pressure of the fluid present in chamber 13 and the deflection of the diaphragm is transmitted to the transducer movement via sleeve 20 and arm 19. The transducer, in the manner described below, translates the reciprocation of arm 19 into a signal indicative of the amount of movement of the arm.

As shown in FIGS. 2, 3, and 4 movement housing 18 includes a top plate 22 and a bottom plate 23, both of which preferably are fabricated from a non-magnetic material such as aluminum. The top and bottom plates abut the opposite ends of a cylindrical body 24 which is defined by a ring magnet elongated along its axis and defining a gap 25 (see FIG. 4) radially therethrough along the length of the magnet. A post member 26 extends centrally along an interior chamber 27 within and defined by the magnetic body of the transducer housing. Body 24 is clamped between plates 22 and 23 by screws 28 engaged with post member 26 through the top and bottom plates, respectively. Bottom plate 23 is secured to housing 11 by mounting screws 29 (see FIG. 1).

Essentially congruent recesses 30 and 31 are formed in the lower and upper surfaces of top and bottom plates 22 and 23, respectively. Centrally of the plates, the recesses are enlarged into circular portions conforming generally to the shape of chamber 27. The recesses also have extension portions 32 and 33, respectively, extending radially of chamber 27 in line with magnet gap 25.

As shown in FIGS. 4 and 5, post member 26 has an integral boss 35 extended laterally from one side of it midway between the ends of the post member. The boss has parallel upper and lower surfaces (only upper surface 36 being shown) which are disposed normal to the plane of gap 25 and are faired or rounded into front and rear surfaces 37 and 38 of the boss. A cavity 39 is formed in the boss and extends from post 26 (see FIG. 4) to an open end spaced from the post member.

A pair of roller members 40 and 41 are engaged with the upper and lower surfaces, respectively, of boss 35 as shown in FIG. 5. The roller members have equal diameter, circularly cylindrical barrel portions 42 and 43, respectively, which are engaged with the boss for rolling movement along the upper and lower surfaces of the boss transversely of the elongate extent of post member 26. The rollers have their axes parallel to each other and normal to the plane of gap 25. Each roller member has a lug portion 44 and 45, respectively, extending radially from the barrel portions thereof toward each other and terminating in semicircularly convexly curved ends, as shown in FIG. 5. A pair of counter-balance weights 46, only one of which is shown in FIG. 4, are secured one to each roller member lug portion by screws 47. The counter-balance weights extend from their respective lug portions into cavity 39 in parallel, spaced relation to the barrel portions of their respective roller members.

A top carriage plate 50 is engaged with the side of the barrel portion of roller member 40 which is opposite from the top surface of post member boss 35. The top carriage plate has a forwardly extending arm 51; arm 19 is secured to the front end of arm 51. The width of the top carriage plate is substantially equal to the length of barrel portion 42. The arm 51, however, has a width approximately half as wide as the top carriage plate and, preferably, as shown in FIG. 5, has one side thereof continuous with the side of the carriage plate which spaced away from the post member. A bottom carriage plate 52 is engaged with the side of the barrel portion of roller member 45 which is opposite from the lower surface of boss 35. The lower carriage plate has a width equal to the width of the top carriage plate and has a short lug 54 extending forwardly therefrom directly below top carriage plate arm 51. Arm 51 and lug 54 define vertically aligned, vertical planar surfaces 55 and 56, respectively, aligned with the centers of the respective carriage plates. The top and bottom carriage plates are disposed parallel to one another and are rigidly interconnected by a strut member 57. The strut member extends between the rear ends of the carriage plates in spaced relation to rear surface 38 of post member boss 35.

The carriage plates, the roller members, and the post member boss are interconnected by a plurality of flexible inelastic ribbons or strips in such a manner that the carriage plates move in tandem without slippage relative to the post member along a straight line parallel to the plane surfaces 55 and 56 and parallel to the plane of gap 25. preferably the inelastic strips are fabricated from stainless steel foil approximately one-thousandth (0.001) inch thick. For example, as shown in FIG. 5, a strip 60 has one end secured, as by spot welding through a very light gauge stainless steel spot welding pad 61 disposed over the end of the strip, to the upper central portion of front surface 37 of post member boss 35. Strip 60 extends across surface 36 of boss 35 parallel to the plane of surfaces 55 and 56 and around the rear portion of the barrel portion of roller member 40 to the other end of the strip which is spot welded, or otherwise secured, to the underside of carriage plate 50 forwardly of barrel portion 42. Similarly, a pair of strips 62, only one of which is visible in FIG. 5, have corresponding ends thereof secured to the underside of carriage plate 50 rearwardly of barrel portion 42 at locations spaced apart transversely of the width of the top carriage plate. Strips 62 pass on opposite sides of strip 60 around the forward side of barrel portion 42 and then along the rear portion of post member boss surface 36 to their opposite ends which are secured to the upper portion of boss surface 38 at spaced apart locations. Similarly, the post member, roller member 41, and bottom carriage plate 52 are interconnected by a pair of strips 63 and by a strip 64. Strips 63 are parallel to one another and extend from aligned, spaced apart ends secured to the lower portion of front surface 37 of the post member boss across the lower surface of the boss, around the rear of roller portion 43, to their opposite ends which are secured to the upper surface of bottom carriage plate 52. Strip 64 is disposed between strip 63 and extends from one end secured to the lower central portion of surface 38 across the lower surface of the boss, around the front of roller portion 43, to its opposite end which is secured to the upper surface of the lower carriage plate rearwardly of barrel portion 43. As shown in FIG. 5 with respect to strip 64, each of strips 60, 62, 63, and 64 are secured, as by spot welding at approximately the midlengths thereof, to the roller portions 42 and 43 around which they extend.

In addition to the interconnection provided between the members via the carriage plates and strut member 57, the roller members are interconnected by a pair of inelastic strips 65 and 66. As shown in FIG. 5, strip 65 has one end secured to the lower front surface of lug portion 44; the strip extends partially around the semi-circularly curved end of the lug portion and then into engagement with and across the rear part of the semi-circularly curved end of the lug portion of roller member 41. The other end of strip 65 is secured to the upper extent of the rear surface of lug portion 45. Strip 66 is similarly interconnected between the roller member lug portions, except that one end of strip 66 is secured to the lower extent of the rear surface of lug member 44 and the other end of the strip is secured to the upper extent of the front surface of lug portion 45.

In view of the above-described interconnection of the carriage plates with post member 26 via roller members 40, 41 and the inelastic strips, and further in view of the rigid interconnection between the carriage plates provided by strut member 57, it is apparent that the carriage plates move together without slippage relative to the post member in a plane common to surfaces 55 and 56. Thus, when arm 19 is reciprocated, both the carriage plates, and any structure connected rigidly to the carrier plates, moves along a straight line in a predetermined plane.

In addition to the non-slip, purely rectilinear movement provided by the structure illustrated in FIG. 5, which structure comprises the central portion of the movement of transducer 10, the presence in the movement of counter-balance weights 46 impart dynamic balance to the mechanism. Moreover, the counter-balance weights urge the movement into the condition illustrated in FIG. 5 wherein lugs portions 44 and 45 of roller members 40 and 41 are aligned with each other. Regardless of the attitude of post member 26, one or the other of the counter-balance weights will seek its lowest position and tend to rotate the roller member to which it is connected. Because of the interconnection of the roller members, however, angular motion of one of the roller members produces corresponding angular motion of the other roller member with the result that lug portions 44 and 45 tend to align themselves.

Barrel portions 42 and 43 of roller members 40 and 41, respectively, are axially bored as at 67 and 68, respectively, so that the transducer movement shown in FIG. 5 has as light a weight as possible. Accordingly, a transducer movement in accord with the foregoing description has a low inertia and is suitable for use in an accelerometer; in an accelerometer the only inertia desired is that of the seismic mass to which arm 19 may be connected. Moreover, since the carriage plates can move only linearly, and then in tandem, the movement is especially useful in accelerometers where it is desired that there be no displacement of the transducer movement when the transducer is subjected to accelerations effective along lines other than the line along which acceleration is to be sensed.

As shown in FIGS. 2, 3, 4, and 5, a non-conductive, non-magnetic support plate 70 is connected between carriage plates 50 and 52 and is disposed parallel to and midway between surfaces 71 and 72 of magnet 24 which define gap 25. Preferably the support plate is fabricated of glass. The support plate is rigidly connected to the carriage plates at surfaces 55 and 56. As will be shown in the following description, plate 70 carries a plurality of magnetoresistive elements for movement transversely of a magnetic field existing in gap 25 in response to movement of arm 19.

FIG. 6 shows a plurality of magnetoresistive elements provided by a film of magnetoresistive material deposited or glued on support plate 70. Preferably four magnetoresistive elements 73–76 are provided, and respective ones of these elements occupy zones A, B, C, and D (see FIG. 6) on the support plates. Each zone corresponds to a corner quarter of plate 70. Elements 73–76 have serpentine configurations on the plate between terminal pads or areas 77–80, respectively, located at the corners of the plate, and common junctions 81 and 82 for elements 73–76 and 74–75, respectively. The serpentine configuration of the magnetoresistive elements provides high resistance devices in a small area. The magnetoresistive material also defines common terminal pads or areas 83 and 84 connected to junction points 81 and 82, respectively. A plurality of regularly spaced conductive strips 86 extend across the transverse extent of each leg of each serpentinely configured magnetoresistive element. Strips 86 provide mechanisms for short circuiting any Hall voltages which may be generated in the elements during operation of the transducer. Only one strip is required on each leg of each element, but it is preferred that a plurality of strips be provided across each leg for best utilization of the magnetoresistive effect. It is preferred that the strips be spaced so that each area of magnetoresistive material between adjacent strips has a width-to-length ratio of about 0.35.

Preferably, the material which defines magnetoresistive elements 73–76 is N-doped indium antimonide, although gallium arsenide, silicon, gallium, bismuth, germanium, indium-arsenide, indium-phosphide, gallium-antimonide, gallium-phosphide or aluminum-antimonide may be used, with or without N or P doping.

Preferably, the material which defines magnetoresistive elements 73–76 is N-doped indium antimonide, although gallium arsenide, silicon, gallium, bismuth, geramium, indium-arsenide, indium-phosphide, gallium-antimonide, gallium-phosphide or aluminum-antimonide may be used, with or without N or P doping.

As shown in FIG. 7, zones A and D are separated from zones C and D by the horizontal centerline 86 of the area of plate 70. Zones A and B are separated from zones C and D by the horizontal centerline 86 of the area of plate 70. Except as the magnetoresistive elements are mirror images of one another, they are substantially identical. Accordingly, in the absence of a magnetic field applied to them, the elements have equal resistances between terminal pads 77–80 and common pads 83 and 84.

Plate 70 is mounted to carrier plates 50 and 51, and post 26 is disposed in magnet 24, in such a manner that line 85 (the line bisecting the vertical extent of plate 70) coincides with the radial midpoint of gap 25.

As shown in FIG. 4, a pair of pole pieces 90 and 91 are carried by magnet surfaces 71 and 72 which define gap 25. The pole pieces are of parallelepiped configuration and have essentially identical rectangular cross-sectional shapes, although trapezoidal cross-sectional configurations may be used if desired. The pole pieces extend along the length of gap 25 and preferably are fabricated from a high mu material. The pole pieces are arranged on magnet surfaces 71 and 72, respectively, so that the centers of the pole pieces are aligned with each other, and so that a line connecting the centers of the pole pieces is coincident with the median radius of the magnet through gap 25. The pole pieces provide a uniform flux distribution across gap 25 at a location centered about the median radius of the magnet.

Shaded area 87 in FIG. 7 represents the position of the flux field across gap 25 and the relation of the flux field to the magnetoresistive elements when the transducer is subjected to a "no load" input, i.e., when the transducer movement is disposed so that lug portions 44, 45, of roller members 40 and 41, respectively, are aligned. Each magnetoresistive element is partially in the magnetic field and partially out of the field.

As shown in FIGS. 1, 2, and 3, four electrically conductive terminal pins 93, 94, 95, and 96 are mounted to top plate 22 of movement housing 18. The pins are mounted to the top plate by an electrically insulating material 97 and project above and below the top plate. Pins 93 and 95 are spaced apart from each other on one side of extension portion 32 of recess 30, and pins 94 and 96 are spaced apart from each other on the other side of the recess extension portion. As shown in FIG. 1, pins 93 and 94 extend through the top plate radially inwardly of permanent magnet body 24 of the movement housing; pins 95 and 96 extend through the housing radially outwardly of the body.

Exteriorly of the transducer movement housing, terminal pads 77 and 79 of magnetoresistive elements 73 and 75, respectively, are conductively connected to terminal pin 96 by a flexible conductor 98. Terminal pad 83 on support plate 70 is connected to terminal pin 95 exteriorly of the movement housing by flexible conductor 99. Terminal pads 78 and 80 of magnetoresistive elements 74 and 76, respectively, are connected to terminal pin 94 within the movement housing. Similarly, terminal pad 84, common to magnetoresistive elements 74 and 75, is connected to the lower end of terminal pin 93. FIG. 8 schematically represents the above-described interconnection of the magnetoresistive elements and the terminal pins, and shows that the magnetoresistive elements are connected together to define a Wheatstone bridge circuit 100 having four active legs comprised of the respective magnetoresistive elements. Terminal pins 93 and 95 comprise the excitation or input terminals to the bridge circuit, and terminal pins 94 and 96 comprise the output terminals of the circuit.

As explained above, a transducer according to this invention, comprises four magnetoresistive elements interconnected together to define a Wheatstone bridge circuit having four active legs. The magnetoresistive elements are disposed in a magnetic field so that, when the transducer movement is in its normal condition, the magnetoresistive elements are equally disposed in a magnetic field. The magnetoresistive elements are disposed on a carrier plate which is mounted for movement transversely of the magnetic field in response to inputs to the transducer. Inputs to the transducer are variations in the value of physical phenomenon to which the transducer is sensitive. Thus, the output of the bridge circuit is a measure of the value of the input to the transducer. For example, in accord with the above description, let it be assumed that pressure transducer 10 is to be used to measure the amount by which the pressure in a duct connected to tubing fitting 15 varies from atmospheric pressure. The pressure in chamber 12 is maintained at atmospheric pressure. If the pressure in chamber 13 is also equal to atmospheric pressure, diaphragm 12 is undeflected and arm 19 is in such a position that the transducer movement is in its undeflected condition, i.e., a condition wherein lug portions 44 and 45 of roller members 40 and 41, respectively, are aligned with each other. In such a condition of the transducer movement, FIG. 7 is representative of the relationship between the magnetoresistive elements and the magnetic field existing across gap 25. Thus, Wheatstone bridge circuit 100 is balanced since magnetoresistive elements 73–76 have equal values of resistance. If, however, the pressure in chamber 13 of transducer housing 11 should fall below atmospheric pressure, the diaphragm is deflected to the left and magnetoresistive elements 73 and 74 (disposed opposite each other in bridge circuit 100) move into the magnetic field to the same extent that magnetoresistive elements 75 and 76 move out of the field, and the change in resistance of each of elements 73–76 is equal to the change in resistance in each of the other elements. Thus, the Wheatstone bridge circuit is unbalanced and a voltage of a given polarity is manifested between terminals 94 and 96 of the bridge circuit. Conversely, if the pressure presented to the chamber 13 is a superatmospheric pressure, the resistance of magnetoresistive elements 75 and 76 increases to the same extent that the resistance of magnetoresistive elements 73 and 74 decreases; the result is that a voltage of an opposite polarity is manifested across the bridge circuit output terminals.

Since the magnetoresistive elements are equally affected by displacement of movement actuator arm 19, the output of the bridge circuit is directly proportional to displacement of the arm. Moreover, since all four legs of the circuit are active and two opposite legs of the circuit increase in resistance when and to the same extent that the other two legs decrease in resistance, a maximum output voltage is produced at the circuit output terminals for a given displacement of the movement actuator arm.

The resistance of a magnetoresistive material will not vary linearly with changes in the magnetic field applied to the material unless the changes in field strength are small. The apparatus described above permits the production of significant linear changes in resistance in elements 73–76 in response to movement of arm 19 since the serpentine configurations of the movable elements in conjunction with a fixed field of constant strength is the equivalent of varying the strength of a magnetic field applied to a fixed element and since the movement of the elements relative to the field is small.

The transducer movement described, as noted above, is useful in transducers other than pressure transducers. The movement described is also useful in transducers wherein the signal generating device is other than a magnetoresistive device but requires that one element be moved linearly relative to another element, as in a differential transformer-type of signal generating mechanism. In such a case, the boss of center post 26 may be replaced by a block fixed relative to the differential transformer coil, for example. The block would define opposite parallel surfaces, equivalent to the top and bottom surfaces of boss 35, aligned parallel to the line of movement of the core of the differential transformer. The core could be connected rigidly between the carriage plates of the movement, and one of the carriage plates would be connected to a member movable in response to variations in the phenomenon to be monitored by the transducer. Such a movement would, as described above, provide only reciprocable movement of the core relative to the transformer coils.

While the invention has been described above in conjunction with specific apparatus, the configurations and relationship thereof, this has been merely by way of example in support of an explanation of a presently preferred embodiment of the invention. Accordingly, the foregoing description is not to be considered as limiting the scope of this invention.

What is claimed is:

1. In an instrument transducer including a member movable in response to variations in the value of a physical phenomenon to which the transducer is sensitive, means for producing a transducer output signal including a pair of elements movable linearly relative to each other, and means coupling one of the elements to the member for movement of the one element relative to the other in response to movement of the member, an improved means mounting the one element for linear motion relative to the other element comprising a block fixed relative to the other element and defining upper and lower surfaces parallel to the line of movement between the elements, spaced upper and lower carriage plates to which the one element is mounted, the carriage plates respectively having lower and upper surfaces spaced from the parallel to the block upper and lower surfaces respectively, a pair of equal diameter rollers engaged respectively between the upper carriage plate lower surface and the block upper surface and between the block lower surface and the lower carriage plate upper surface, the rollers having their axes of rotation parallel and normal to the line of relative movement between the elements, means rigidly interconnecting the carriage plates, means coupling the member to one of the carriage plates for movement of the carriage plates in response to movement of the member, and a plurality of inelastic flexible strips interconnected between each roller, the block and the carriage plate engaged with the respective roller so that the rollers roll between the block and the carriage plates without slippage and so that the carriage plates move only parallel to said line of relative movement.

2. A transducer for sensing the value of a selected physical phenomenon comprising
   (a) a displacement member movable in response to variations in the value of said phenomenon,
   (b) an annular permanent magnet having a radial slot therethrough along its length to define a gap and a magnetic field across the gap,
   (c) a plurality of magnetoresistive elements, and
   (d) movement means coupled between the displacement member and the elements for mounting the magnetoresistive elements in the gap and operable in response to movement of the member for moving the elements in the gap transversely of the field, the movement means including
      (1) a post member disposed centrally of the magnet and fixed relative thereto and having a lateral extension defining parallel upper and lower surfaces,
      (2) spaced upper and lower carriage plates between which the magnetoresistive elements are mounted in the gap and having lower and upper surfaces, respectively, spaced from and disposed parallel to the post member extension upper and lower surfaces, respectively,
      (3) a pair of equal diameter rollers engaged one between the upper carriage plate lower surface and the extension upper surface and one between the extension lower surface and the lower carriage plate upper surface, the rollers having their axes of rotation parallel to each other and normal to the plane of the magnet slot,
      (4) means rigidly interconnecting the carriage plates,
      (5) means coupling one of the carriage plates to the displacement member for reciprocation of the one carriage plate in response to movement of the displacement, member, and
      (6) a plurality of inelastic flexible strips interconnected between each carriage plate, the post member extension and the roller engaged with the respective carriage plate so that the rollers roll between the extension and the carriage plates whereby the carriage plates move equally and simultaneously along parallel lines in response to reciprocation of the one carriage plate.

3. A transducer according to claim 2 including a counter-balance weight connected to each roller, the weights being arranged so that the movement means is biased into a condition wherein the magnetoresistive elements occupy predetermined positions relative to the field.

References Cited

UNITED STATES PATENTS

| | | | |
|---|---|---|---|
| 2,712,601 | 7/1955 | Reinwald | 328—225 |
| 2,945,379 | 7/1960 | Barnes et al. | 73—517 |
| 3,025,461 | 3/1962 | Snellen | 324—46 |
| 3,286,161 | 11/1966 | Jones et al. | 323—94 |

MILTON O. HIRSHFIELD, *Primary Examiner.*

WARREN E. RAY, *Assistant Examiner.*

UNITED STATES PATENT OFFICE
CERTIFICATE OF CORRECTION

Patent No. 3,396,328                                August 6, 1968

Lloyd Tan-Wai Yuan

It is certified that error appears in the above identified patent and that said Letters Patent are hereby corrected as shown below:

Column 2, line 46, after "movement" insert -- housing --. Column 3, line 48, "which" should read -- which is --; line 69, "preferably" should read -- Preferably --. Column 4, line 33, before "members" insert -- roller --; line 64, "lugs" should read -- lug --. Column 5, line 58, beginning with "Preferably, the" cancel all to and including "or P doping." in line 63, same colum 5; line 65, "C and D" should read -- B and C --; line 66, after "of" insert -- support --; line 67, "horizontal centerline 86" should read -- longitudinal centerline 85 --. Column 7, line 73, "the" should read -- and --.

Signed and sealed this 3rd day of March 1970.

(SEAL)
Attest:

Edward M. Fletcher, Jr.                      WILLIAM E. SCHUYLER, JR.
Attesting Officer                                     Commissioner of Patents